F. D. NEWBURY AND H. D. JAMES.
SYSTEM OF EXCITATION FOR SYNCHRONOUS BOOSTER ROTARY CONVERTERS.
APPLICATION FILED DEC. 13, 1917.

1,392,076.

Patented Sept. 27, 1921.

WITNESSES:

INVENTORS
Frank D Newbury &
Henry D James
BY
ATTORNEY

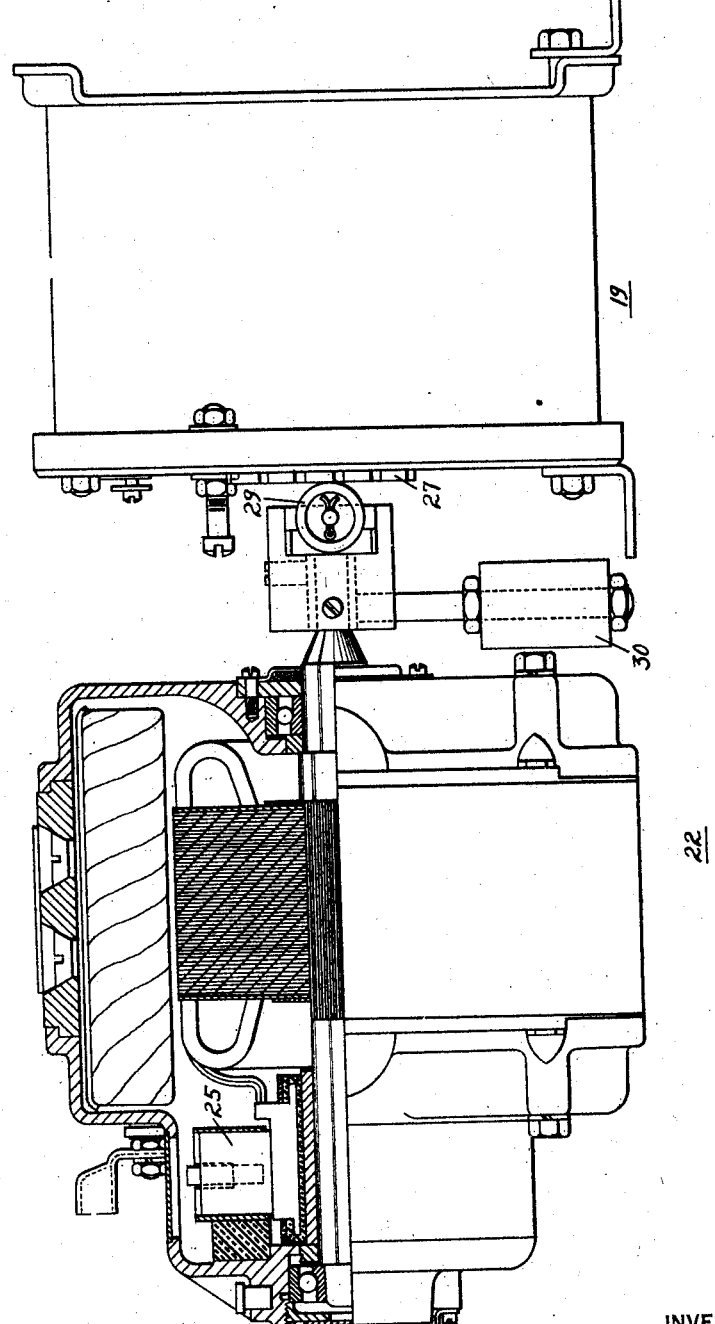

UNITED STATES PATENT OFFICE.

FRANK D. NEWBURY, OF PITTSBURGH, AND HENRY D. JAMES, OF EDGEWOOD PARK, PENNSYLVANIA, ASSIGNORS TO WESTINGHOUSE ELECTRIC & MANUFACTURING COMPANY, A CORPORATION OF PENNSYLVANIA.

SYSTEM OF EXCITATION FOR SYNCHRONOUS-BOOSTER ROTARY CONVERTERS.

1,392,076.      Specification of Letters Patent.    Patented Sept. 27, 1921.

Application filed December 13, 1917. Serial No. 206,927.

*To all whom it may concern:*

Be it known that we, FRANK D. NEWBURY, a citizen of the United States and a resident of Pittsburgh, in the county of Allegheny and State of Pennsylvania, and HENRY D. JAMES, a citizen of the United States, and a resident of Edgewood Park, in the county of Allegheny and State of Pennsylvania, have invented a new and useful Improvement in Systems of Excitation for Synchronous-Booster Rotary Converters, of which the following is a specification.

Our invention relates to systems of excitation for synchronous-booster rotary converters, and it has for its object to provide a system of the character designated wherewith the proper commutating field may be supplied throughout wide changes in load current and in output voltage of the converter.

Figure 1:
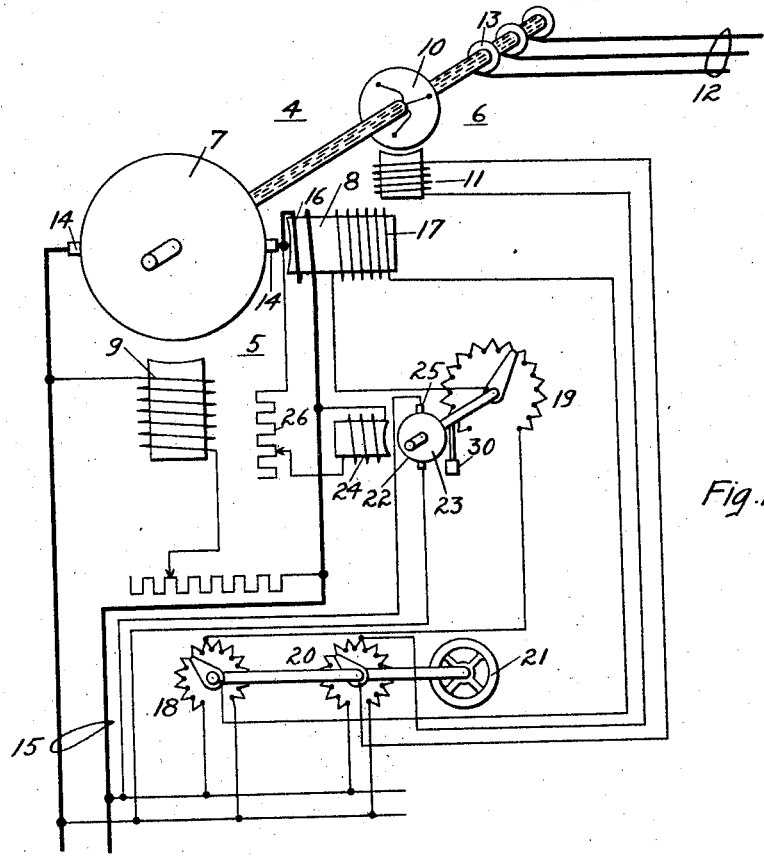
Figure 2:
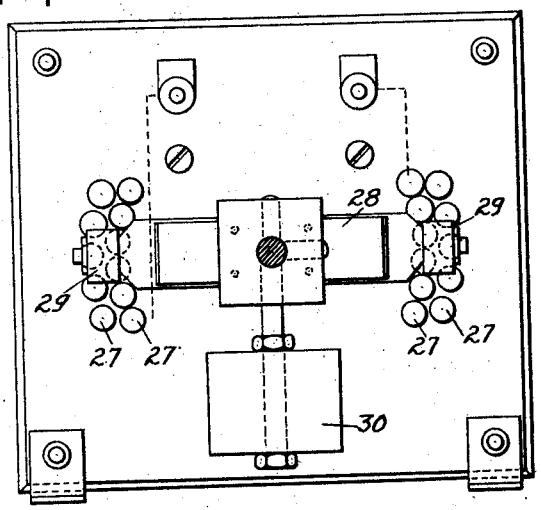

In the accompanying drawings, Figure 1 is a diagrammatic view of a synchronous-booster rotary converter, together with auxiliary apparatus and circuits, embodying a preferred form of our invention; and Figs. 2 and 3 are end and side views, respectively, of a torque-motor rheostat employed in the system of Fig. 1.

It is well known, in connection with synchronous-booster rotary converters employing interpoles for the production of a proper commutating field, that proper excitation may be provided for said interpole if it be excited by a series-type field winding designed to supply the proper field at zero buck or boost, if said interpole is further provided with an auxiliary field winding arranged to provide a field varying in magnitude and direction with the booster field excitation and if said auxiliary field excitation is further arranged to be adjusted in accordance with the load current on the rotary converter. Apparatus of this nature is fully disclosed and discussed in an article entitled "Synchronous booster rotary converters" by Yardley appearing on page 267 *et seq.* of the "*Electric Journal*" for 1914.

In the apparatus disclosed by Yardley, the load control of the auxiliary field winding is effected by four relays connected across a load-current shunt. Thus the excitation of the auxiliary field winding is adjusted in four steps and only an approximation is obtained to the desired uniform adjustment thereof in accordance with the load current.

In accordance with the present invention, we provide a shunt-type torque motor connected to a rheostat in circuit with the interpole field winding, whereby a great multiplicity of regulating steps is obtained and a substantially uniform control of the auxiliary interpole field winding, in accordance with the load current, is thus secured.

Referring to the drawing for a more detailed understanding of our invention, we show a synchronous booster rotary converter at 4 in Fig. 1, said machine embodying a rotary converter 5 and a booster machine 6. The converter 5 embodies an armature 7, an interpole 8 and an exciting field winding 9. The booster machine 6 embodies an armature 10 and an exciting field winding 11.

Energy for the operation of the booster rotary converter is derived from suitable supply mains 12 in the form of alternating current and, after passing through suitable slip rings 13 and the winding of the booster armature 10, is supplied to the alternating-current terminals of the converter armature 7. Direct current derived from the brushes 14 of the converter is supplied to suitable load mains 15 through a series interpole field winding 16. The interpole 8 is further excited by an auxiliary field winding 17 deriving its excitation from the mains 15 through a reversing rheostat 18 and through a non-reversing adjustable rheostat 19. The booster field winding 11 is also excited from the mains 15 through a reversing rheostat 20, mechanically coupled to the reversing rheostat 18, said rheostats being jointly adjustable, as by a handle 21, so that the excitation of the auxiliary interpole field winding 17 is simultaneously adjusted and simultaneously reversed in accordance with the adjustment of the excitation of the booster field winding 11.

The adjustable rheostat 19 is under the control of a torque motor 22, said motor comprising an armature 23 and an exciting field 24. The armature 23 is excited from a source, such, for example, as the mains 15, through brushes 25. The field winding 24 is excited in proportion to the load current of the converter as, for example, by being connected in shunt relation to the series interpole field winding 16 through a manually adjustable resistor 26.

The mechanical details of the torque motor 22 are shown more clearly in Figs. 2 and 3. Said motor is, in many respects, of usual type, as indicated by the partial cross-section thereof in Fig. 3, being provided with ball bearings so as to rotate substantially without friction. The resistor 19 is provided with faceplate contacts at 27—27 and the shaft of the motor 22 carries an arm 28 provided with small rollers 29—29 adapted to coact with the contact members 27—27, thus varying the effective value of the resistor 19, with little or no frictional drag upon the motor 22. The motor armature 23, together with the arm 28, is biased to a neutral position as, for example, by a suitable counterweight 30.

Having thus described the arrangement of a system embodying our invention, the operation thereof is as follows: The field winding 16 is so adjusted as to provide the proper interpole excitation under conditions of inactivity in the booster machine 6. The mechanical interconnection between the rheostats 18 and 20 causes the excitation of the auxiliary interpole field winding to vary, in amount and in direction, in accordance with the excitation of the booster field winding 11, the arrangement being such that the field winding 17 assists the field winding 16 under bucking conditions, when the net armature reaction within the rotary converter is relatively large, and opposes the field winding 16 under boosting operating conditions, when the net armature reaction within the rotary converter is relatively small.

A further regulation of the excitation of the auxiliary field winding 17, in accordance with the load current of the converter, is effected by the torque motor 22, the deflection of which is nearly proportional to the load current as the operating torque is proportional to the product of the armature excitation and of the load-adjusted field excitation, said torque being opposed by the counterweight 30.

With the type of rheostat face plate shown, an extremely large number of adjusting steps for the resistor 19 may be obtained, resulting in the close regulation of the excitation of the field winding 17.

Particular attention is directed to the fact that, by the use of a shunt-type torque motor, a relatively large deflection is obtained with small load variations at light load because of the direct relation obtaining between the load current and developed torque. Attention is also directed to the fact that the shunt connection of the torque-motor armature winding across the direct current mains produces a motor in which the moving part consists of fine-wire coils and may therefore be of very light construction.

It will be noted that the voltage across the mains 15 is considerably greater under conditions of maximum boost than under conditions of maximum buck. Thus, for a given line current and maximum direct-current voltage, a greater movement of the torque motor results than with the same line current and minimum voltage. As more ampere turns in the auxiliary interpole excitation are required for a given load and a given voltage boost than for the same load and voltage buck, this voltage connection of the torque motor is preferable to the excitation of the torque-motor armature from a source of constant potential, even were such a source available.

While we have shown and described our invention in its preferred form, it will be obvious to those skilled in the art that it is not so limited but is susceptible of various minor changes and modifications without departing from the spirit thereof and we desire, therefore, that only such limitations shall be placed thereupon as are imposed by the prior art or are specifically set forth in the appended claims.

We claim as our invention:

1. The combination with a synchronous booster rotary converter of the interpole type provided with a series-type commutating field winding designed to produce the proper commutating field under conditions of zero buck or boost and further provided with an auxiliary commutating field winding, of means for exciting said last-mentioned winding, in direction and in magnitude, in accordance with the excitation of the booster machine, means for further regulating the excitation of said auxiliary field winding in accordance with the load current of said converter comprising a variable resistor in circuit with said auxiliary field winding, and a torque motor for controlling said resistor, said torque motor having a rotatable member, a stationary member, a winding on each of said members, means for energizing the winding on said stationary member in accordance with the load current of said converter, and substantially constant, relatively high-voltage means for energizing the other of said torque-motor windings, whereby the current in said commutating field winding has a varying component which is substantially proportional to said load current.

2. The combination with a synchronous booster rotary converter of the interpole type provided with a series-type commutating field winding designed to produce the proper commutating field under conditions of zero buck or boost and further provided with an auxiliary commutating field winding, of means for exciting said last-mentioned winding, in direction and in magnitude, in accordance with the excitation of the booster machine, means for further regulating the excitation of said auxiliary field winding in accordance with the load current of said converter comprising a current-limiting device in circuit with said auxiliary field winding, and a torque motor for controlling said current-limiting device, said torque motor having a relatively fine-wire armature winding and a field winding, means for energizing one of said torque-motor windings in accordance with the load current of said converter, and substantially constant means for energizing the other of said torque-motor windings, whereby the current in said auxiliary commutating field winding is varied in substantial accordance with said load current.

3. The combination with a synchronous booster rotary converter of the interpole type provided with a series-type commutating field winding designed to produce the proper commutating field under conditions of zero buck or boost and further provided with an auxiliary commutating field winding, of means for exciting said last-mentioned winding, in direction and in magnitude, in accordance with the excitation of the booster machine, means for further regulating the excitation of said auxiliary field winding in accordance with the load current of said converter comprising a variable resistor in circuit with said auxiliary field winding, and a torque motor for controlling said resistor, said torque motor having armature and field windings, means for energizing one of said torque-motor windings in accordance with the load current of said converter, and means for energizing the other of said torque-motor windings in accordance with the output voltage of said converter.

4. The combination with a synchronous booster rotary converter of the interpole type provided with a series-type commutating field winding designed to produce the proper commutating field under conditions of zero buck or boost and further provided with an auxiliary commutating field winding, of means for exciting said last-mentioned winding, in direction and in magnitude, in accordance with the excitation of the booster machine, means for further regulating the excitation of said auxiliary field winding in accordance with the load current of said converter comprising a current-limiting device in circuit with said auxiliary field winding, and a torque motor for controlling said current-limiting device, said torque motor having armature and field windings, means for energizing said torque-motor armature winding in accordance with the output voltage of said converter, and means for energizing said torque-motor field winding in accordance with the load current of said converter.

5. The combination with a rotary converter provided with cross-field windings, of a booster electrically associated therewith and provided with field windings, means for exciting said cross-field windings in accordance with the direct current of the converter, auxiliary means for adjusting both the strength and direction of the excitation of said booster field windings and for simultaneously and similarly supplying a component of excitation to said cross-field windings, torque-indicating means responsive to the boosted voltage of said converter, and means responsive to said torque-indicating means for varying the effect of said auxiliary means upon the excitation of said cross-field windings.

6. The combination with a rotary converter provided with cross-field windings, of a booster electrically associated therewith and provided with field windings, means for exciting said cross-field windings in accordance with the direct current of the converter, auxiliary means for adjusting both the strength and direction of the excitation of said booster field windings and for simultaneously and similarly supplying a component of excitation to said cross-field windings, torque-indicating means responsive to the product of the boosted voltage and the load current of said converter, and means responsive to said torque-indicating means for varying the effect of said auxiliary means upon the excitation of said cross-field windings.

7. The combination with a rotary converter provided with cross-field windings, of a booster electrically associated therewith and provided with field windings, main means for exciting said cross-field windings in accordance with the load current of the converter, and auxiliary means for adjusting both the strength and direction of the excitation of said booster field windings, and for simultaneously supplying a component of excitation to said cross-field windings, said auxiliary means operating in such manner that said component of excitation opposes said main cross-field excitation during boosting conditions and assists the same during bucking conditions, and operating also in such manner that the ratio between said component of excitation and said booster field excitation increases as said auxiliary means is adjusted from maximum buck to maximum boost.

8. The combination as specified in claim 8, in combination with additional means for adjusting the effect of said auxiliary means upon the excitation of said cross-field windings.

9. The combination with a rotary converter provided with cross-field windings, of a booster electrically associated therewith and provided with field windings, means for exciting said cross-field windings in accordance with the direct current of the converter, auxiliary means for adjusting both the strength and direction of the excitation of said booster field windings and for simultaneously and similarly supplying a component of excitation to said cross-field windings, and means responsive to the boosted voltage of said converter for varying the effect of said auxiliary means upon the excitation of said cross-field windings.

10. The combination with a rotary converter provided with cross field windings, of a booster electrically and mechanically associated therewith and provided with field windings, means for exciting said cross-field windings in accordance with the direct current of the converter, auxiliary means for adjusting both the strength and direction of the excitation of said booster field windings and for simultaneously and similarly supplying a component of excitation to said cross-field windings, and means responsive to both the load current and the boosted voltage of said converter for varying the effect of said auxiliary means upon the excitation of said cross-field windings.

11. The method of improving the commutation of a synchronous booster rotary converter of the class described, which consists in maintaining a commutating field having a component proportional to the load current of the converter, in maintaining an additional component of commutating field which varies in direction and magnitude in accordance with the adjustments of the voltage of the booster, and in causing the ratio between said last mentioned component and said booster voltage to increase as said booster is adjusted from maximum buck to maximum boost.

12. The method of improving the commutation of a synchronous booster rotary converter of the class described, which consists in maintaining a commutating field having a component proportional to the load current of the converter, in maintaining an additional component of commutating field which varies in direction and magnitude in accordance with the adjustments of the voltage of the booster, in causing the ratio between said last mentioned component and said booster voltage to increase as said booster is adjusted from maximum buck to maximum boost, and in varying said last mentioned component in accordance with the load current of said converter.

13. The method of improving the commutation of a synchronous booster rotary converter of the class described, which consists in maintaining a commutating field having a component proportional to the load current of the converter, in maintaining an additional component of commutating field which varies in direction and magnitude in accordance with the adjustments of the voltage of the booster, and in varying said last mentioned component in accordance with the boosted voltage of the converter.

14. The method of improving the commutation of a synchronous booster rotary converter of the class described, which consists in maintaining a commutating field having a component proportional to the load current of the converter, in maintaining an additional component of commutating field which varies in direction and magnitude in accordance with the adjustments of the voltage of the booster, and in varying said last mentioned component in accordance with both the boosted voltage and the load current of the converter.

15. The method of improving the commutation of a commutator-type dynamo-electric machine having a variable translating device mechanically connected thereto for interchanging power in either direction therewith, which consists in producing a component of commutating field excitation which varies in direction with the direction of said power interchange and varies in magnitude in such a manner that the ratio between said component of excitation and said power interchange varies as said translating device varies from maximum positive mechanical load on said machine to maximum negative mechanical load on said machine.

16. The method of improving the commutation of a commutator-type dynamo-electric machine having a variable translating device mechanically connected thereto for interchanging power in either direction therewith, which consists in producing a component of commutating field excitation which varies in direction with the direction of said power interchange and varies in magnitude in such a manner that the ratio between said last-mentioned component of excitation and said power interchange decreases as said translating device varies from maximum positive mechanical load on said machine to maximum negative mechanical load on said machine.

17. The method of improving the commutation of a commutator-type dynamo-electric machine having a variable translating device mechanically connected thereto for interchanging power in either direction therewith, which consists in producing a component of commutating field excitation which varies in direction with the direction of said power interchange and varies in magnitude in such a manner that the ratio between said last-mentioned component of excitation and said power interchange decreases as said translating device varies from maximum positive mechanical load on said machine to maximum negative mechanical load on said machine, and in producing another component of excitation which varies both in accordance with the load current and in accordance with said power interchange.

In testimony whereof we have hereunto subscribed our names this 30th day of Nov., 1917.

FRANK D. NEWBURY.
HENRY D. JAMES.